(12) United States Patent
Kim et al.

(10) Patent No.: US 10,559,977 B2
(45) Date of Patent: Feb. 11, 2020

(54) INTRA-MICROGRID COMMUNICATION ARCHITECTURE

(71) Applicant: United Technologies Corporation, Farmington, CT (US)

(72) Inventors: Moon C. Kim, Glastonbury, CT (US); Kaiyu Wang, Vernon, CT (US); Stella M. Oggianu, West Hartford, CT (US); Robert K. Thornton, Coventry, CT (US); Yiqing Lin, Glastonbury, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 111 days.

(21) Appl. No.: 15/737,914

(22) PCT Filed: Jul. 10, 2015

(86) PCT No.: PCT/US2015/039960
§ 371 (c)(1),
(2) Date: Dec. 19, 2017

(87) PCT Pub. No.: WO2017/010974
PCT Pub. Date: Jan. 19, 2017

(65) Prior Publication Data
US 2018/0159366 A1   Jun. 7, 2018

(51) Int. Cl.
*H02J 13/00* (2006.01)

(52) U.S. Cl.
CPC .. *H02J 13/0062* (2013.01); *G05B 2219/2614* (2013.01); *G05B 2219/2642* (2013.01)

(58) Field of Classification Search
CPC ...... H02J 13/0062; H02J 13/0075; H02J 3/12; H02J 3/32; H02J 3/38; H04L 12/2836;
(Continued)

(56) References Cited

U.S. PATENT DOCUMENTS 6,553,403 B1   4/2003   Jarriel et al.
7,024,666 B1   4/2006   Brown
(Continued)

FOREIGN PATENT DOCUMENTS

CN   202026329 U   11/2011
CN   102801790 B   7/2013
(Continued)

OTHER PUBLICATIONS

International Search Report and Written Opinion for Patent Cooperation Treaty Application PCT/US15/39960, dated Oct. 6, 2015.
(Continued)

*Primary Examiner* — Charles E Anya
(74) *Attorney, Agent, or Firm* — Carlson, Gaskey & Olds, P.C.

(57) ABSTRACT

A microgrid according to an exemplary aspect of the present disclosure includes, among other things, a plurality of intelligent electronic devices configured to communicate directly with one another in a first language. Each of the intelligent electronic devices includes a controller and a gateway. The gateway is configured to convert incoming messages from the first language to a second language native to the controller. The first language is different than the second language. A method is also disclosed.

9 Claims, 3 Drawing Sheets

(58) Field of Classification Search
CPC .. H04L 2012/285; Y04S 10/18; Y02E 60/724; G05B 2219/2614; G05B 2219/2642
See application file for complete search history.

(56) References Cited

U.S. PATENT DOCUMENTS

| | | | |
|---|---|---|---|
| 7,349,761 | B1 | 3/2008 | Cruse |
| 8,019,697 | B2 | 9/2011 | Ozog |
| 8,160,824 | B2 | 4/2012 | Spanier et al. |
| 8,176,189 | B2 | 5/2012 | Traversat et al. |
| 8,682,495 | B2 | 3/2014 | Carralero et al. |
| 8,819,649 | B2 | 8/2014 | Lafreniere et al. |
| 9,009,230 | B1 | 4/2015 | Matthieu et al. |
| 2006/0130063 | A1 | 6/2006 | Kilian et al. |
| 2010/0082176 | A1 | 4/2010 | Chang |
| 2012/0089384 | A1* | 4/2012 | Coyne ................ G06F 17/5022 703/18 |
| 2013/0091258 | A1 | 4/2013 | Shaffer et al. |
| 2013/0332240 | A1 | 12/2013 | Patri et al. |
| 2014/0280672 | A1* | 9/2014 | Day ................... H04L 67/2842 709/213 |
| 2014/0280713 | A1 | 9/2014 | Dolezilek et al. |
| 2014/0292533 | A1 | 10/2014 | Kamel et al. |
| 2015/0097697 | A1* | 4/2015 | Laval ...................... H04L 69/03 340/870.02 |
| 2015/0194039 | A1* | 7/2015 | Martin ................. G08B 21/182 340/632 |
| 2017/0005515 | A1* | 1/2017 | Sanders ................. H02J 3/381 |

FOREIGN PATENT DOCUMENTS

| | | |
|---|---|---|
| EP | 1976218 A1 | 1/2008 |
| WO | 2006065275 A1 | 6/2006 |
| WO | 2014164976 A1 | 10/2014 |

OTHER PUBLICATIONS

Ding, Yongsheng, et al. "Communication Mechanisms in Ecological Network-based Grid Middleware for Service Emergence," Elsevier, Science Direct, Information Sciences 177 (2007) pp. 722-733, Aug. 1, 2006.

Jarbee, Paul. "INSTEON Devloper's Guide—1-15," 2nd Edition, pp. i-xi, 1-397, Feb. 23, 2009.

International Preliminary Report on Patentability for PCT/US2015/039960, dated Jan. 25, 2018.

* cited by examiner

| DESTINATION / SOURCE | ENERGY MANAGEMENT SYSTEM | GRID SWITCH | GENERATOR | BATTERY MANAGEMENT | REGEN ELEVATOR | LOAD(S) |
|---|---|---|---|---|---|---|
| ENERGY MANAGEMENT SYSTEM | | | • GEN POWER SETUP | • BM POWER SETUP<br>• POWER FACTOR CORRECTION<br>• DYNAMIC LOAD COMPENSATION<br>• BATT SETUP<br>• GRIDSW ENABLE | • ELEV LOW POWER MODE | • LOAD POWER LEVEL<br>• LOAD SET UP |
| GRID SWITCH | • GRID STATUS<br>• GRID V,I,P<br>• MICROGRID V,I,P | | | • GRID STATUS<br>• GRID V,I,P<br>• MICROGRID V,I,P | | |
| GENERATOR | • GEN STATUS<br>• GEN P | | | | | |
| BATTERY MANAGEMENT | • BM STATUS<br>• BM P<br>• BATT V, SOC | • READY TO CONNECT | | | | |
| REGEN ELEVATOR | • ELEV STATUS<br>• ELEV P<br>• ELEV POSITION | | | • ELEV STATUS<br>• ELEV PROFILE | | |
| LOAD(S) | • LOAD STATUS<br>• LOAD POWER LEVEL | | | | | |

FIG.3

INTRA-MICROGRID COMMUNICATION ARCHITECTURE

STATEMENT REGARDING GOVERNMENT SUPPORT

This invention was made with government support under Contract No. DE-EE0003954 awarded by the United States Department of Energy. The government has certain rights in this invention.

BACKGROUND

This disclosure relates to a microgrid and, in particular, to the manner in which intelligent electronic devices (IEDs) within a microgrid communicate with one another.

Microgrids are known to include one or more IEDs associated with a building, for example. Some example IEDs include battery management systems, generators, regenerative elevator systems, energy management systems, and grid switches. Microgrids are connected to an external power grid by way of a "smart" switch in some examples.

Known microgrids include a communication architecture having a central control system. The IEDs in the microgrid communicate with the control system. The control system includes a plurality of communication protocols and data models. Further, the individual IEDs have to be modified to include communication protocols corresponding to those of the control system to enable the respective IED to communicate with the control system. This approach is somewhat cumbersome in that it requires modifying a variety of IEDs and because directing all communications through the control system introduces delay.

SUMMARY

A microgrid according to an exemplary aspect of the present disclosure includes, among other things, a plurality of intelligent electronic devices configured to communicate directly with one another in a first language. Each of the intelligent electronic devices includes a controller and a gateway. The gateway is configured to convert incoming messages from the first language to a second language native to the controller. The first language is different than the second language.

In a further non-limiting embodiment of the foregoing microgrid, each gateway is configured to recognize a predefined message in the first language and to identify a corresponding message in the second language.

In a further non-limiting embodiment of the foregoing microgrid, each intelligent electronic device includes a wireless transceiver configured to transmit and receive messages to a wireless transceiver of another intelligent electronic device in the microgrid.

In a further non-limiting embodiment of the foregoing microgrid, each first language stack includes an incoming first language application configured to parse incoming bits into a message in the first language, and place the parsed messages into an incoming first language queue.

In a further non-limiting embodiment of the foregoing microgrid, each gateway receives the parsed messages from the incoming first language queue and associates each parsed message with a message in the second language, and wherein the gateway places the messages in the second language in a second language queue.

In a further non-limiting embodiment of the foregoing microgrid, each controller is configured to determine an intelligent electronic device function corresponding to the messages in the second language queue.

In a further non-limiting embodiment of the foregoing microgrid, each intelligent electronic device includes an outgoing second language application configured to parse bits into a message from the respective intelligent electronic device in the second language, and to update a variable corresponding to the parsed message from the respective intelligent electronic device.

In a further non-limiting embodiment of the foregoing microgrid, the first language stack is configured to generate an outgoing message in the first language based on the update to the variable, and to place the outgoing message in an outgoing first language queue.

In a further non-limiting embodiment of the foregoing microgrid, the messages in the outgoing first language queue are transmitted to at least one of the other intelligent electronic devices in the microgrid.

In a further non-limiting embodiment of the foregoing microgrid, the plurality of intelligent electronic devices includes at least two of an energy management system, a grid switch, a regenerative elevator system, a generator, a lighting system, an HVAC system, a computer, and a battery management system.

In a further non-limiting embodiment of the foregoing microgrid, at least some of the second languages native to the controllers of each of the intelligent electronic devices are different from one another.

A method of communicating between intelligent electronic devices within a microgrid according to an exemplary aspect of the present disclosure includes, among other things, communicating a message directly from a first intelligent electronic device to a second intelligent electronic device in a first language. The method further includes converting the message from the first language to a second language native to a controller of the second intelligent electronic device. The first language is different from the second language.

In a further non-limiting embodiment of the foregoing method, the method includes receiving the message as a plurality of bits at the second intelligent electronic device, parsing the bits into a message in the first language, and placing the parsed message into an incoming first language queue.

In a further non-limiting embodiment of the foregoing method, the method includes recognizing the message from the incoming first language queue as a predefined message in the first language and identifying a message in the second language corresponding to the predefined message, and placing the identified message in the second language in a second language queue.

In a further non-limiting embodiment of the foregoing method, the method includes executing a function of the second intelligent electronic device in response to the message from the second language queue, and generating bits corresponding to a message indicating the function has been performed.

In a further non-limiting embodiment of the foregoing method, the method includes parsing the generated bits into a message in a second language.

In a further non-limiting embodiment of the foregoing method, the method includes updating a variable in response to the message in the second language, generating an outgoing message in the first language based on the update to the variable, and placing the outgoing message in an outgoing first language queue.

In a further non-limiting embodiment of the foregoing method, the method includes transmitting the outgoing messages in the outgoing first language queue to another intelligent electronic device.

In a further non-limiting embodiment of the foregoing method, the first intelligent electronic device is one of an energy management system, a grid switch, a regenerative elevator system, a generator, and a battery management system, and wherein the second intelligent electronic device is another of an energy management system, a grid switch, a regenerative elevator, a generator, a lighting system, an HVAC system, a computer, and a battery management system.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

In FIG. 2, the example IED is a grid switch.

FIG. 3 is a table including a number of example, predefined distributive power system (DPS) protocol messages.

DETAILED DESCRIPTION

Microgrids include one or more intelligent electronic devices (IEDs) configured to control power distribution within a system. This disclosure provides a communication architecture that allows direct communication between the IEDs within the microgrid.

Figure 1:
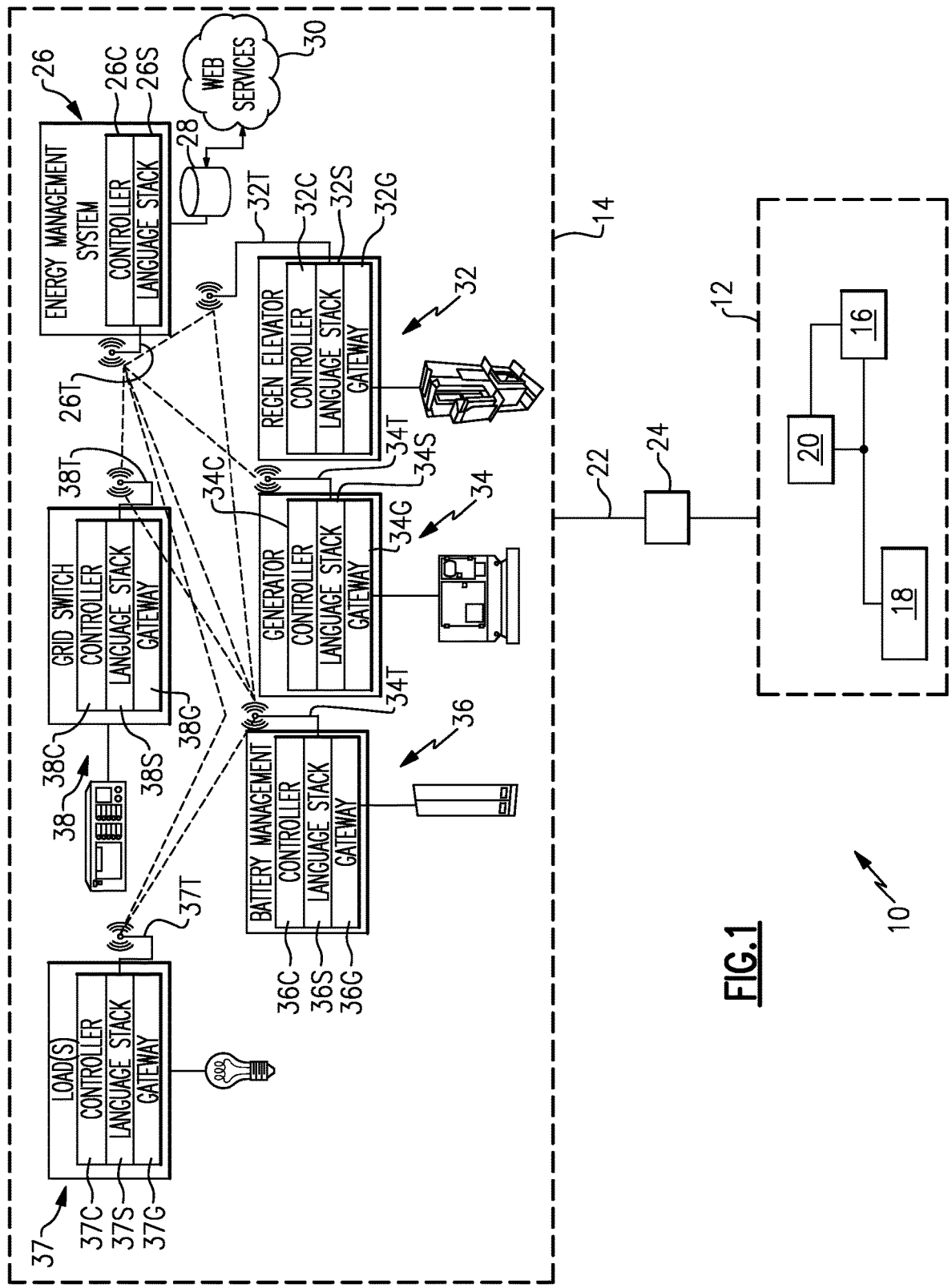
FIG. 1 schematically illustrates an example grid.

FIG. 1 schematically illustrates an example electrical grid 10 including a main grid 12 and a microgrid 14. The main grid 12 has an external power source 16 provided by a main or utility power service, for example. In one example, the external power source 16 is a hydroelectric, gas, coal, steam, or nuclear power generation source, although other power sources are contemplated in this disclosure. The main grid 12 also has one or more associated external loads 18 (only one illustrated). The external loads 18 may be a variety of different power consumption devices, such as household, industrial, or commercial electrical devices. Other loads can also be coupled to the electrical grid 10, such as heating, ventilating, and air conditioning (HVAC) units. The main grid 12 may further include one or more associated external storage devices 20, such as thermal storage tanks, although other external storage devices are contemplated in this disclosure.

The microgrid 14 is electrically coupled to the main grid 12 via an electrical bus 22 by way of a switch 24, such as a circuit breaker. The switch 24 is operable to selectively connect or disconnect the microgrid 14 from the main grid 12. While a switch 24 is shown, other types of connections come within the scope of this disclosure. While external loads 18 are shown, there could be loads internal to the microgrid 14. In that case, the loads within the microgrid 14 can still operate even when the main grid 12 is out (i.e., not functioning).

The microgrid 14 includes a microgrid controller 26, which, in this example, is an energy management system (EMS) configured to manage power distribution within the microgrid 14. The microgrid controller 26 includes a controller 26C and a language stack 26S. It should be understood that the controller 26C may be any known type of controller including memory, hardware, and software. The controller 26C is configured to store instructions and to provide instructions to the various components of the microgrid 14. The language stack 26S may be a software application embodied on the controller 26C.

In this example, the language stack 26S is configured to send and receive a plurality of messages in a first language via a transceiver 26T. The transceiver 26T is a wireless transceiver, and is configured to wirelessly communicate with the IEDs within the microgrid 14. The microgrid controller 26 could also communicate using wired connections, however.

The microgrid controller 26 is further in communication with a database 28, which receives and stores information from the cloud 30 (e.g., the Internet) regarding the electricity market and the weather, for example. The microgrid controller 26 can then use that information to make decisions regarding how power is distributed within the microgrid 14.

Again, the language stack 26S is configured to send and receive messages in the first language. In this example, the first language is based upon or includes a distributive power system (DPS) protocol. The DPS protocol is used in this example exclusively for communications between the components of the microgrid 14. The communications according to the protocol are transmitted, in one example, as a series of bits. As will be discussed below, the microgrid controller 26 (and the other IEDs within the microgrid 14) is configured to parse DPS protocol messages and execute corresponding functions.

In the illustrated example, the microgrid 14 includes five IEDs 32, 34, 36, 37, 38 in addition to the microgrid controller 26. This disclosure extends to microgrids having different numbers of IEDs, and is not limited to any particular IED type. Each of the IEDs includes a controller 32C, 34C, 36C, 37C, 38C, a language stack 32S, 34S, 36S, 37S, 38S, and a gateway 32G, 34G, 36G, 37G, 38G. Like the microgrid controller 26, the language stacks 32S, 34S, 36S, 37S, 38S are configured to send and receive a plurality of messages in the first language via a transceiver 32T, 34T, 36T, 37T, 38T to the other components within the microgrid 14. In this example, the first language is the same first language discussed above relative to the microgrid controller 26 (i.e., the DPS protocol).

Similar to the microgrid's controller 26C, the controllers 32C, 34C, 36C, 37C, 38C may be any known type of controller including memory, hardware, and software. The controllers 32C, 34C, 36C, 37C, 38C are configured to store instructions and to provide instructions to the various components of the microgrid 14. The language stacks 32S, 34S, 36S, 37S, 38S and gateways 32G, 34G, 36G, 37G, and 38G may be a software applications embodied on the respective controller.

While the microgrid controller 26 and the IEDs 32, 34, 36, 37, and 38 are configured to communicate with one another in the first language, each IED controller 32C, 34C, 36C, 37C, 38C may be configured to send and receive instructions and commands in a second language different than the first language. In one example, the second language of each controller is based on or includes a protocol native to that particular controller. Thus, each IED 32, 34, 36, 37, 38 may have a controller configured to operate using a native language different than that of each of the other IEDs.

For example, in the illustrated embodiment, the first intelligent electronic device 32 is a regenerative elevator system. The controller 32C is configured to send and receive commands corresponding to the operative state of the regenerative elevator system 32. The second intelligent electronic device 34 is a generator and includes a controller 34C programmed in a language specific to the generator 34. The third intelligent electronic device 36 is a battery management system, which includes a controller 36C specific to a particular battery management system. The fourth intelligent electronic device 37 is at least one load. The at least one load may include a lighting system, an HVAC system, or a computer. The fifth intelligent electronic device 38 is a grid switch including one or more circuit breakers, and includes a controller 38C configured to provide instructions to the grid switch 38 in its native language. In some examples, the grid switch 38 could be integrated into the switch 24. In other words, the functions of the grid switch 38 and the switch 24 could be performed by a single switch.

In order to allow direct communication (e.g., without an intermediate control system) between the microgrid controller 26 and the IEDs 32, 34, 36, 37, 38, each of the IEDs includes a gateway 32G, 34G, 36G, 37G, 38G, respectively, configured to convert incoming messages from the first, common language (e.g., the DPS protocol) to a second language native to the particular controller 32C, 34C, 36C, 37C, 38C. The IEDs are also configured to generate messages in the first language based on a function performed by the particular IED. In general, each of the IEDs share, and agree on, common definitions for messages provided in the first language. In some cases, that includes converting outgoing messages from the IED from the second, native language of the IED to the first language. In other cases, that includes generating an outgoing message in the first language based on an update to a global variable (discussed in detail below).

Figure 2:
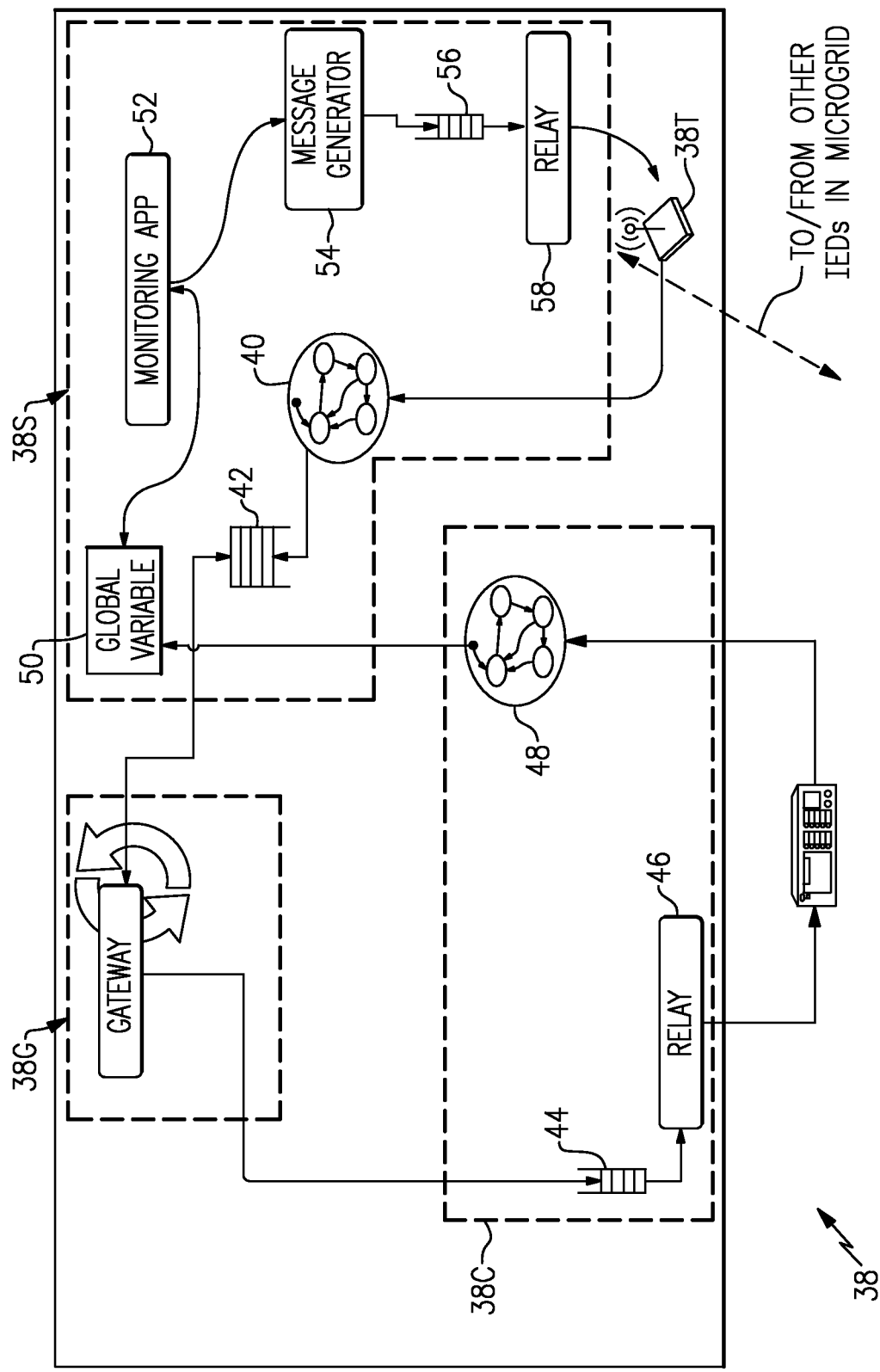
FIG. 2 schematically illustrates an example intelligent electronic device (IED).

FIG. 2 schematically illustrates an example IED in detail. In particular, FIG. 2 illustrates the detail of the grid switch 38. It should be understood that corresponding aspects of the other IEDs 32, 34, 36, and 37 are arranged similarly. Further, in this example the microgrid controller 26 is arranged similarly, albeit without a gateway.

In FIG. 2, the grid switch 38 is configured to send and receive messages in the first, common language via the transceiver 38T. Incoming messages are directed from the transceiver 38T to the language stack 38S. Within the language stack 38S, the grid switch 38 includes an incoming first language application 40 configured to parse incoming bits into a message in the first language. The messages consist of a series of bits. In some examples, the bits identify a particular IED, a command or instruction to the IED, a payload, message priority, etc. Once a message has been parsed by the incoming first language application 40, the parsed message is placed into an incoming first language queue 42.

From the incoming first language queue 42, the messages are relayed to the gateway 38G. At the gateway 38G, the messages in the first language are associated with a corresponding message in a second language, which is a language native to the controller 38C of the grid switch 38. To this end, the gateway 38G is programmed to recognize a plurality of possible incoming messages in the first language, and is programmed to associate those possible incoming messages to a predefined, corresponding message in the second language native to the controller 38C.

Once an appropriate message in the second language is identified, the message is placed into a second language queue 44. From the second language queue 44, the controller 38C provides the message, via a communication channel 46, to the grid switch 38. The grid switch 38 performs a function corresponding to the message from the second language queue 44. In one example, the grid switch 38 is instructed to open or close a particular circuit breaker.

Following performance of that function, the grid switch 38 generates an outgoing message in the second language indicating that the function was performed. The outgoing message, in one example, takes the form of a string of bits. The outgoing message is parsed by a second language application 48. The outgoing second language application 48 then updates a database of global variables, at 50, consistent with the information in the outgoing message. For example, if the function performed by the grid switch 38 was to open a particular circuit breaker, the global variable associated with that circuit breaker would have changed from a "1" ("one") to a "0" ("zero").

Alternatively, the database of global variables 50 can be updated by some operational conditions associated with the grid switch 38. That is, the grid switch 38 can perform certain functions without needing an instruction from another device. In other words, while the grid switch 38 is responsive to commands received by the transceiver 38T, the grid switch 38 also performs functions based on its own determination.

The global variable database is continually monitored by a monitoring application, at 52. If a change in a global variable occurs, the monitoring application 52 will instruct a message generator 54 to generate a message in the first language corresponding to the update to the global variable. Once generated, that message is then placed into an outgoing first language queue 56, and is sent to a particular IED within the microgrid 14 via a communication channel 58 and the wireless transceiver 38T. In one example, the message generated by the update to the global variable is sent back to the IED that provided the original, incoming command to the grid switch 38 to confirm that the original command has been performed.

Again, while FIG. 2 only shows the grid switch 38, it should be understood that each of the intelligent electronic devices 32, 34, 36, 37 would be arranged similarly for purposes of communicating with other IEDs. Further, the microgrid controller 26, while it does not have a gateway, would also be arranged similarly. The microgrid controller 26 includes a controller 26C that is programmed in the first language (DPS protocol) and thus does not require a gateway.

FIG. 3 is a table and illustrates, by destination and source, several example messages that may be sent between the microgrid controller 26 and the various IEDs 32, 34, 36, 37, 38. Each of the gateways 32G, 34G, 36G, 37G, and 38G is programmed to receive the messages illustrated in FIG. 3 and is configured to convert these messages into the native language of the particular controller 32C, 34C, 36C, 37C, 38C. The example messages shown in FIG. 3 are by no means limiting and this disclosure extends to other types of messages. In FIG. 3, V stands for "voltage," I stands for "current," P stands for "power," and SOC stands for "state of charge." As illustrated in FIG. 3, the energy management system 26 will receive information regarding the status of the at least one load 37, such as power level or other status information, and the energy management system 26 can use that information to maintain a particular power level, if desired.

This disclosure allows the components of the microgrid (e.g., the IEDs 32, 34, 36, 37, and 38 as well as the microgrid controller 26) to communicate directly with one another without needing to communicate through an intermediate, central controller. The result is a microgrid that is easily adaptable to platform changes, such as changes in the native language (e.g., a software update) of one of the IEDs. In that instance, the gateway associated with the particular IED simply needs to be updated to maintain the ability to communicate with other IEDs, rather than requiring an update of each component within the microgrid. The disclosed microgrid also reduces bandwidth loads by providing direct communication. Further, existing microgrids can relatively easily be retrofit to include the disclosed communication architecture.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A microgrid for communicating between intelligent electronic devices, the microgrid comprising:
 a plurality of intelligent electronic devices configured to communicate directly with one another in a first language, wherein each of the intelligent electronic devices includes a controller and a gateway, the gateway being configured to convert incoming messages from the first language to a second language native to the controller, wherein the first language is different than the second language,
 wherein each of the intelligent electronic devices include a first language stack, the first language stack configured to send and receive messages in the first language,
 wherein each first language stack includes an incoming first language application configured to parse incoming bits into a message in the first language, and place the parsed messages into an incoming first language queue,
 wherein each gateway receives the parsed messages from the incoming first language queue and associates each parsed message with a message in the second language, and wherein the gateway places the messages in the second language in a second language queue,
 wherein each controller is configured to determine an intelligent electronic device function corresponding to the messages in the second language queue,
 wherein each intelligent electronic device includes an outgoing second language application configured to parse bits into a message from the respective intelligent electronic device in the second language, and to update a variable corresponding to the parsed message from the respective intelligent electronic device and
 wherein the first language stack is configured to generate an outgoing message in the first language based on the update to the variable, and to place the outgoing message in an outgoing first language queue.

2. The microgrid as recited in claim 1, wherein each gateway is configured to recognize a predefined message in the first language and to identify a corresponding message in the second language.

3. The microgrid as recited in claim 1, wherein each intelligent electronic device includes a wireless transceiver configured to transmit and receive messages to a wireless transceiver of another intelligent electronic device in the microgrid.

4. The microgrid as recited in claim 1, wherein the messages in the outgoing first language queue are transmitted to at least one of the other intelligent electronic devices in the microgrid.

5. The microgrid as recited in claim 1, wherein the plurality of intelligent electronic devices includes at least two of an energy management system, a grid switch, a regenerative elevator system, a generator, a lighting system, an HVAC system, a computer, and a battery management system.

6. The microgrid as recited in claim 5, wherein at least some of the second languages native to the controllers of each of the intelligent electronic devices are different from one another.

7. A method of communicating between intelligent electronic devices within a microgrid, comprising:
 communicating a message directly from a first intelligent electronic device to a second intelligent electronic device in a first language;
 converting the message from the first language to a second language native to a controller of the second intelligent electronic device, the first language being different from the second language;
 receiving the message as a plurality of bits at the second intelligent electronic device;
 parsing the bits into a message in the first language;
 placing the parsed message into an incoming first language queue;
 recognizing the message from the incoming first language queue as a predefined message in the first language and identifying a message in the second language corresponding to the predefined message;
 placing the identified message in the second language in a second language queue;
 executing a function of the second intelligent electronic device in response to the message from the second language queue; and
 generating bits corresponding to a message indicating the function has been performed;
 parsing the generated bits into a message in a second language;
 updating a variable in response to the message in the second language;
 generating an outgoing message in the first language based on the update to the variable; and
 placing the outgoing message in an outgoing first language queue.

8. The method as recited in claim 7 comprising:
 transmitting the outgoing messages in the outgoing first language queue to another intelligent electronic device.

9. The method as recited in claim 7, wherein the first intelligent electronic device is one of an energy management system, a grid switch, a regenerative elevator system, a generator, and a battery management system, and wherein the second intelligent electronic device is another of an energy management system, a grid switch, a regenerative elevator, a generator, a lighting system, an HVAC system, a lighting system, and a battery management system.

* * * * *